United States Patent
Marks et al.

[19]

[11] Patent Number: 5,844,896
[45] Date of Patent: Dec. 1, 1998

[54] SYSTEM AND METHOD FOR ROUTING TELEPHONE CALLS

[75] Inventors: Martin R. Marks, Phoenix, Ariz.; Roberto Yslas, Broomfield, Colo.; R. Eric Pflum, Gilbert; William C. Catellier, Glendale, both of Ariz.

[73] Assignees: U S West, Inc., Denver; MediaOne Group, Englewood, both of Colo.

[21] Appl. No.: 806,973

[22] Filed: Feb. 26, 1997

[51] Int. Cl.[6] .................................................. H04M 7/06

[52] U.S. Cl. ...................... 370/385; 370/429; 370/439; 370/522; 379/207; 379/220

[58] Field of Search .................................. 370/357, 360, 370/381, 384, 428, 429, 522, 438, 439; 379/207, 220

[56] References Cited

U.S. PATENT DOCUMENTS

| | | | |
|---|---|---|---|
| 5,440,623 | 8/1995 | Moore et al. | 379/212 |
| 5,610,912 | 3/1997 | Johnston | 370/359 |
| 5,652,790 | 7/1997 | Andruska et al. | 370/207 |
| 5,701,301 | 12/1997 | Weisser, Jr. | 370/428 |

*Primary Examiner*—Douglas W. Olms
*Assistant Examiner*—Seema S. Rao
*Attorney, Agent, or Firm*—Brooks & Kushman, P.C.

[57] ABSTRACT

A method of routing a telephone call from a Caller to a Subscriber telephone line in an Advanced Intelligent Network (AIN) equipped with Terminating Attempt Trigger (TAT) and Terminating Next Event List (NEL) functionality and having at least one Central Office Switch (COS) and a Service Control Point (SCP) in electrical communication with a plurality of Subscriber switches via a signalling method and system. The system includes an intelligent peripheral in electrical communication with the COS and the SCP and which is equipped with queuing functionality for each of the Subscribers and operative to place a call to the COS for receipt by a Subscriber having a call placed in queue in response to a determination that the Subscriber's line is idle.

8 Claims, 4 Drawing Sheets

SYSTEM AND METHOD FOR ROUTING TELEPHONE CALLS

TECHNICAL FIELD

This invention relates to a method for routing telephone calls in an Advanced Intelligent Network using a Terminating Attempt Trigger (TAT) and Next Event List (NEL) functionality.

BACKGROUND ART

For businesses that receive many phone calls per day, it is common for a telephone company to provide such Subscribers with more than a single incoming telephone line on which to receive calls. These multiple lines are commonly configured as a Hunt group. The Hunt group has a telephone number associated with it, which when dialed would cause a telephone routing system to attempt to connect the call to each of the incoming telephone lines until an idle line is found.

Many businesses also subscribe to voice messaging or queuing services provided by their telephone company. In such systems, if all the telephone lines in the Hunt group are busy or go unanswered, the Voice Messaging Service (VMS) generates a computer-activated message instructing the Caller to leave a message. The message is then recorded by the Voice Messaging System and is stored in a computer, thereby allowing Subscribers to listen to the recorded messages and call back the customers who were unable to get through. With queuing services, if all the telephone lines in the Hunt group are busy, a computer-activated message is similarly generated instructing the Caller that all operators are currently busy, and that the call will be answered in the order received.

While the above call handling features have worked well for the majority of call handling situations, they have their drawbacks. Namely, neither feature allows a Caller to choose whether she wants to leave a message or to remain on the line while a call is answered. U.S. Pat. No. 5,440,623 to Moore et al. overcomes this problem through use of a switch based approach. As disclosed therein, Moore is directed to a telephone routing system for use in a main telephone switching office having programmable Central Office Switches and a Voice Messaging System. The programmable Central Office Switches are the type that provide prioritized features to a telephone number including queuing, Call Forward Don't Answer to the Voice Messaging System, and Call Forward Busy Line to the Voice Messaging System. The routing system further includes a set of incoming telephone lines that are configured as a multi-line Hunt group having a Hunt Group Directory Number associated with it. The Hunt Group Directory Number has queuing, Call Forward Line to the VMS and Call Forward Don't Answer to the VMS features enabled. The multi-line Hunt group has further associated with it a set of individual Hunt group telephone numbers that are matched to each of the incoming telephone lines. Each individual Hunt group telephone number has the features Call Forward Busy Line to the VMS and Call Forward Don't Answer to the VMS enabled, but does not have a queuing feature enabled.

While the switch-based approach of Moore et al. uniquely combines queuing and voice messaging features with existing telephone switching and voice messaging hardware, it does so at a cost which has limited its use to larger business customers. Moreover, because the approach is switch-based, it is inapplicable to next generation network systems, namely Advanced Intelligent Networks.

Consequently, a need exists for a system and method which permits residential customers and small to medium sized business customers the ability to place incoming calls in a queue when all of their lines are busy for later retrieval. Such a system and method should obviate the need for a Subscriber to purchase telephone lines equivalent to the maximum queue size as well as the hardware needed to provide such queuing function. Subscribers should not be required to purchase any additional telephone lines or hardware to provide the required queuing function.

SUMMARY OF THE INVENTION

It is an object of the present invention to provide a system and method for routing a telephone call in an Advanced Intelligent Network (AIN) using switch-based triggers.

A more specific object of the present invention is the provision of a system and method for routing a telephone call from a Caller to a Subscriber telephone line in an Advanced Intelligent Network using a Terminating Attempt Trigger (TAT) and Next Event List (NEL) functionality.

In carrying out the above objects, there is provided an Intelligent Peripheral (IP) preferably, but not necessarily, a Bellcore Intelligent Services Peripheral (ISP), in electrical communication with at least one Central Office Switch (COS) and at least one Service Control Point (SCP), preferably, but not necessarily, a Bellcore Integrated Services Control Point of an Advanced Intelligent Network. In keeping with the invention, the Subscriber's line is equipped with a Terminating Attempt Trigger (TAT) and the SCP with the Next Event List (NEL) functionality. The at least one Central Office Switch and the at least one Service Control Point are each provided in electrical communication with a plurality of Subscriber Switches via a Signalling network, preferably a Signaling System No. 7 (SS7) signalling network.

A TAT trigger is set against the Subscriber's line in the terminating switch. Call processing in the switch is configured to detect a TAT trigger. Upon detection of a TAT trigger, a query is launched to the SCP. The SCP sends a query to the IP and requests the queue status of the Subscriber line. If the queue is determined to be active, the call is forwarded to the IP wherein it is added to the queue. In contrast, if the queue is determined to be empty, the call is delivered to the Subscriber and a NEL is set to determine the status of a Subscriber's line. If it is determined that the line is idle, the call is connected to the Subscriber.

Alternatively, if it is determined that the Subscriber's line is busy, the Caller is forwarded to the IP to be placed in queue. Thereafter, the Subscriber's line is further monitored so as to notify the SCP when the line is idle. Once an idle condition is detected a query is sent to the SCP. The SCP then sends an instruction to the IP to deliver the Caller from the queue to the Subscriber. When the call is answered, Answer Supervision is forwarded to the IP whereupon the Subscriber is initially connected to the IP and an announcement is played telling the Subscriber the number of calls currently stacked (waiting) in queue. Instructions are then sent to the COS where the Caller and Subscriber are connected and the IP is released.

The above objects, features and advantages of the present invention are readily apparent from the following detailed description of the best modes for carrying out the invention when taken in connection with the accompanying drawings, wherein like reference numerals most correspond to like components.

BEST MODE FOR CARRYING OUT THE INVENTION

Figure 1:
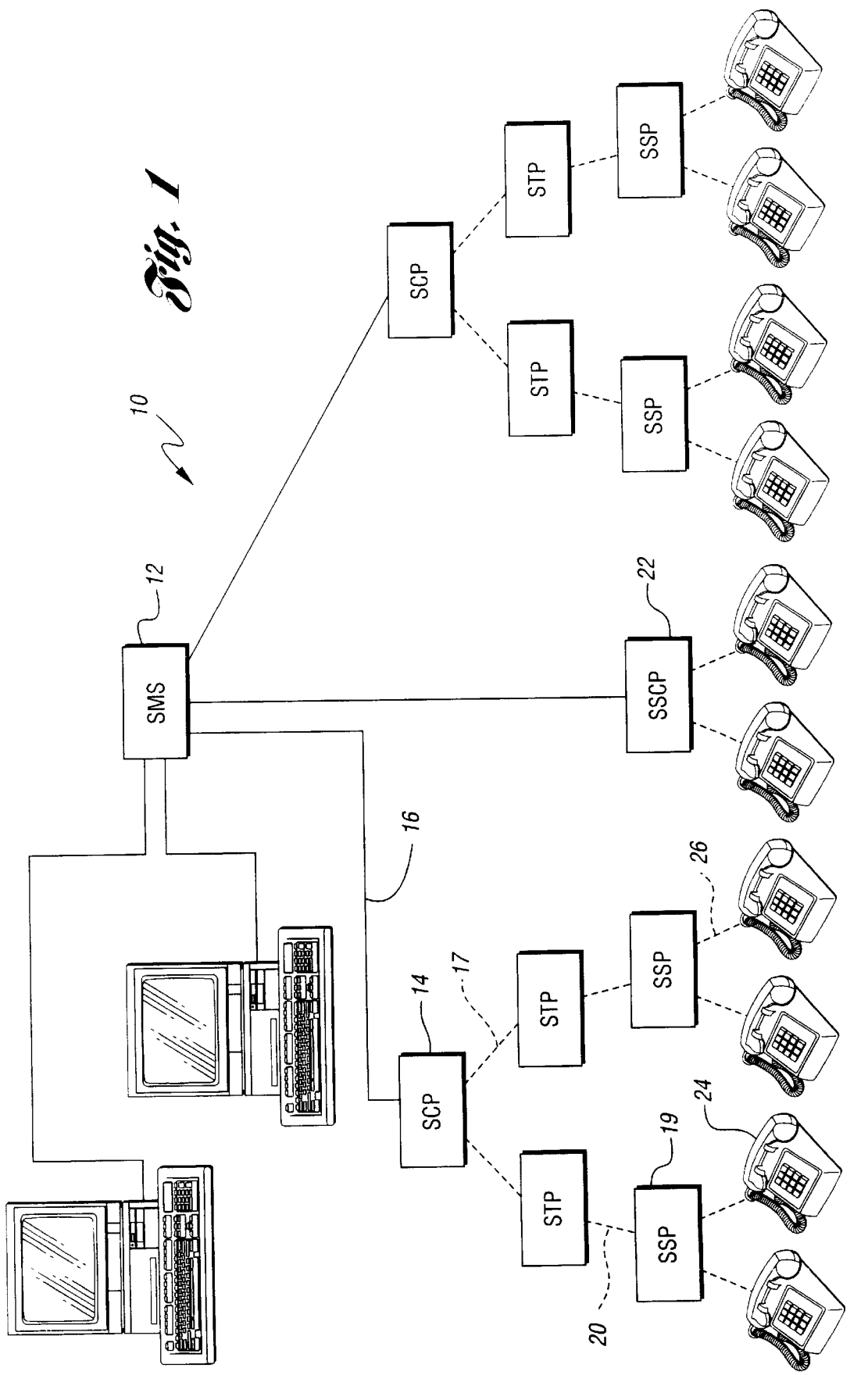
FIG. 1 is a block diagram of a representative Advanced Intelligent Network (AIN)

With reference to FIG. 1 of the drawings, a schematic diagram of a representative Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. SS7 generally operates at 56 kbPS and can support variable message lengths up to 2,176 bits (272 octets) of information per message.

The SS7 network disclosed is comprised of various package switching elements and transmission links, some of which are shown in network architecture. As seen, there is also provided Service Management System (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of Service Control Points (SCP's)/adjuncts 14 via wide area network management links 16. Again, as those skilled in the art will recognize, AIN Service Control Points 14 are nodes which contain the service logic and associated data support to execute the required customer services.

Still further, there is provided Signal Transfer Points (STP's) 18 in electrical communication with SCP/adjunct 14 via signalling links 17. Service Transfer Points 18 are packet switches used to route signaling messages within the network. Service Switching Points (SSP) 19 are also provided. Service Switching Points 19 are generally nodes, usually the Subscriber's local switch/Central Office Switch which recognize the triggers generated when a Subscriber's service invokes an intelligent network trigger and then communicates with the SCP to operate the service.

As shown, Service Switching Points 19 are provided in electrical communication with Signal Transfer Points 18 via signalling links 20. In limited traffic situations, Service Switching and Control Points (SSCP's) 22 may also be provided for combining the functions of the SCP and SSP, respectively. Finally, Subscribers 24 are provided, each having at least one Customer Premises Equipment (CPE) device such as a telephone, facsimile machine, voice messaging peripheral, modem, or the like. As shown, CPE devices 24 are provided in electrical communication with Service Switching Points 19 (COS) via telephone lines 26.

The AIN architecture referred to above is known to permit services to be extended throughout the network. In operation, new services are typically installed on two SCP processing platforms for directly servicing a selected market. In operation, this service management system extends management and control to the remote Service Control Points/Adjuncts via a signaling network.

Figure 2:
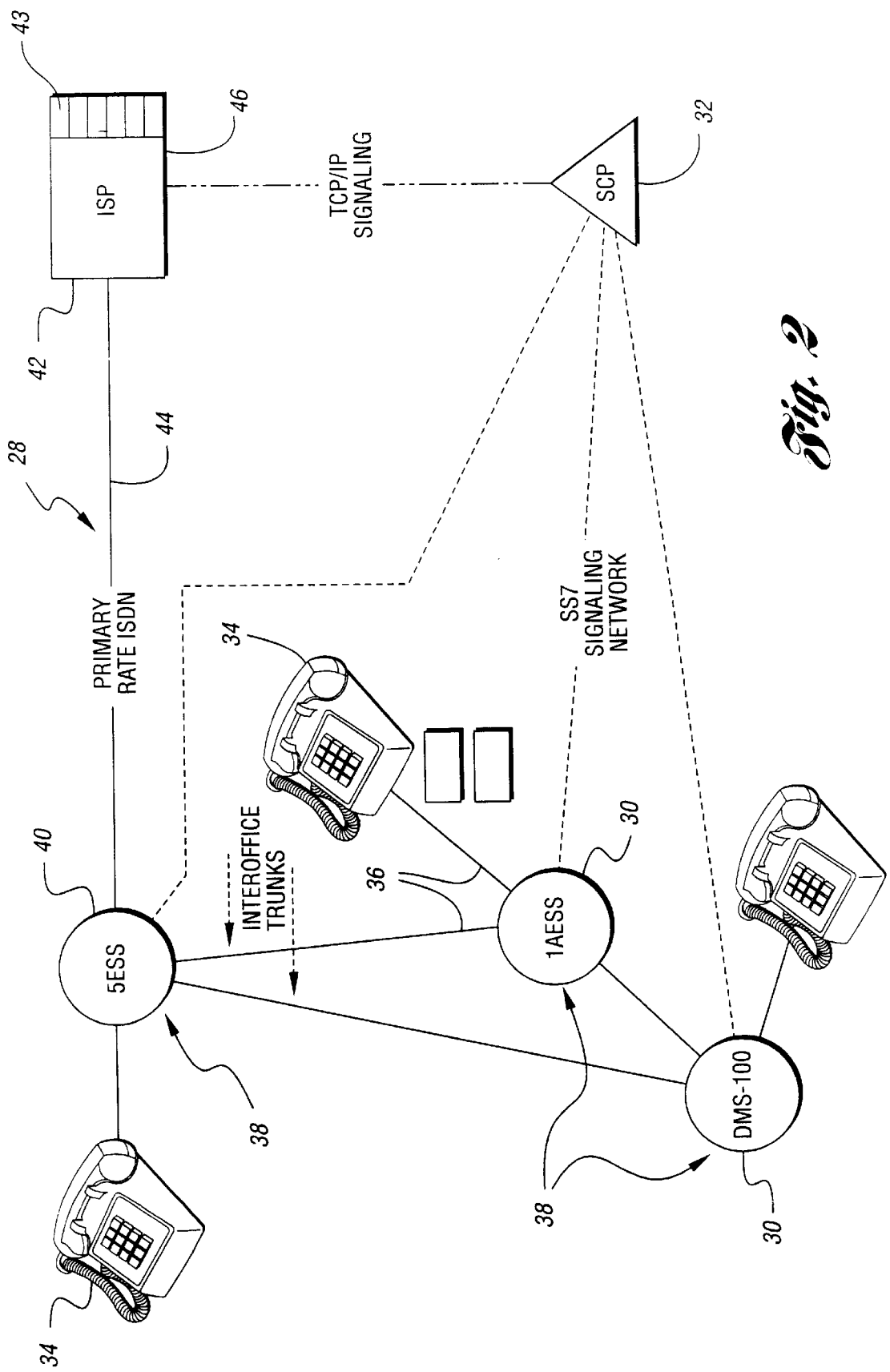
FIG. 2 is a block diagram of a telephone routing system operative to carry out the method of the present invention.

Turning now to FIG. 2, there is shown a schematic diagram of a system used to implement the method of the present invention. As shown, the system which is designated generally by reference numeral 28 includes at least one Subscriber Switch 30 which is provided in electrical communication with at least one Service Control Point 32 and at least one, preferably a plurality, of Subscribers 34 so as to define an Advanced Intelligent Network 38. The Advanced Intelligent Network is equipped with Terminating Attempt Trigger and terminating Next Event List functionality the operation of which is well known to those skilled in the art and therefore need not be discussed here in further detail.

One of the Switches 40 in system 28 may be designated as a host Central Office Switch by virtue of the fact that it is provided in electrical communication with an Intelligent Peripheral 42. The Intelligent Peripheral 42 is preferably, but not necessarily, a Bellcore Intelligent Services Peripheral which is provided in electrical communication with the host Central Office Switch 40 via Primary Rate Integrated Services Digital Network (ISDN) links 44 and further provided in electrical communication with SCP 32 via TCP/IP (wide area network) signaling 46. In further keeping with the invention, each of the Subscribers 34 maintains a dedicated and preferably, but not necessarily Subscriber programmable number of queuing slots 43 within the IP 42.

Figure 3:
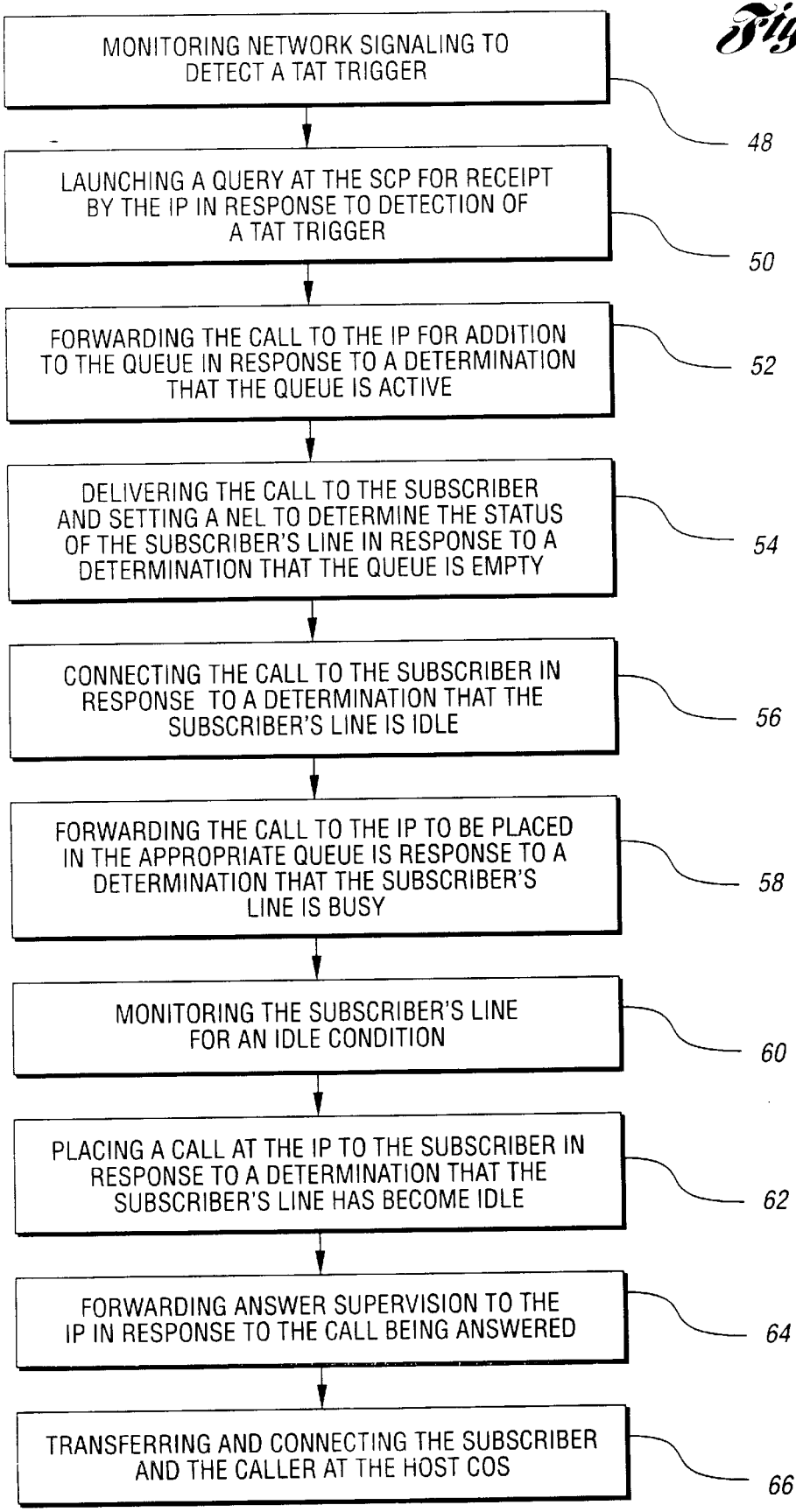
FIG. 3 is a block diagram illustrating the method steps of the present invention.
Figure 4:
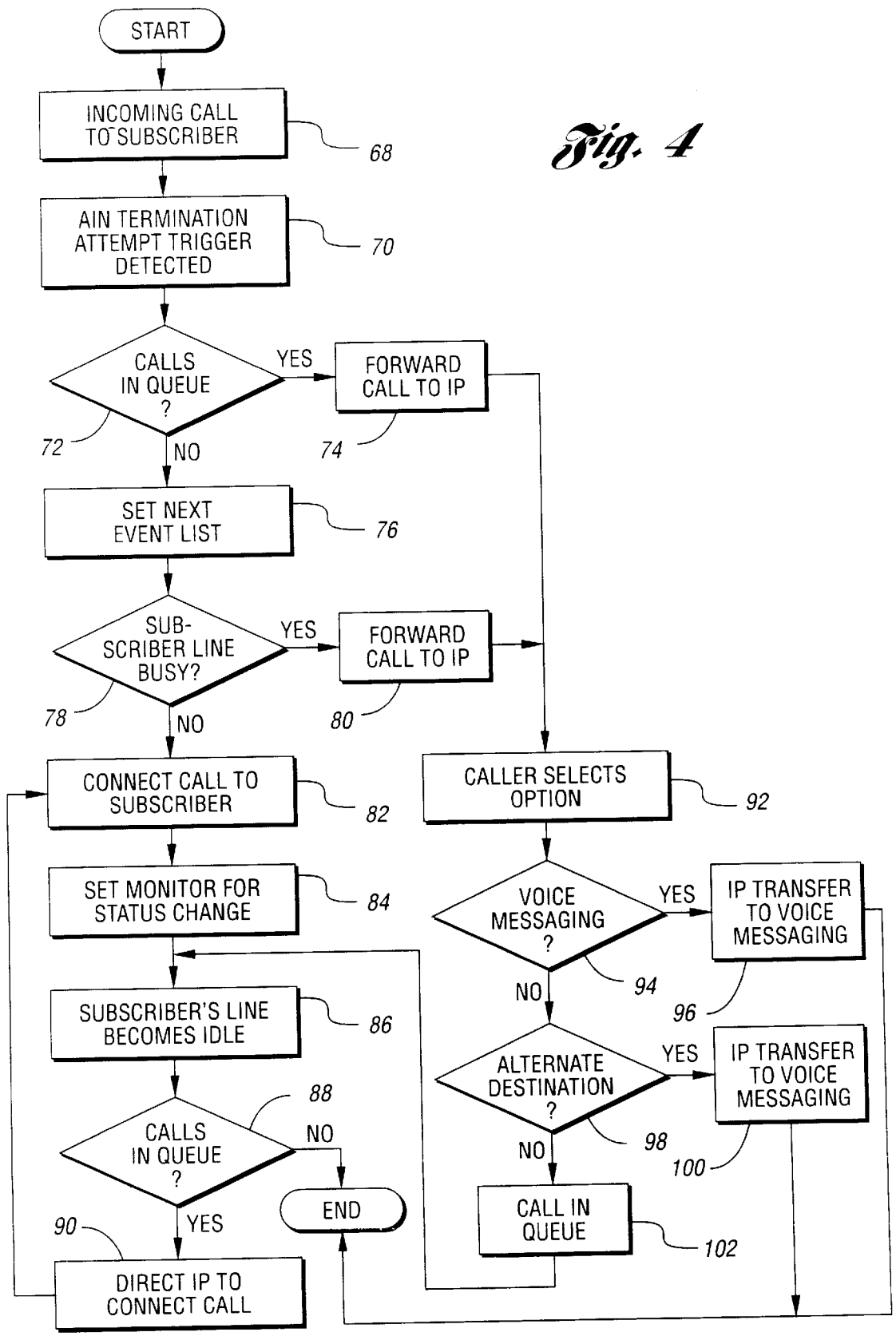
FIG. 4 is a flow diagram illustrating the method of the present invention.

Turning now to FIGS. 3–4 of the drawings, the method of the present invention may be described in further detail. As discussed above, the method is specifically directed for use in an Advanced Intelligent Network such as that illustrated in system 28 of FIG. 2 which is further equipped with Terminating Attempt Trigger (TAT) and Next Event List (NEL) functionality. It is this specific functionality, coupled with the provision of an IP 42 which is similarly equipped with queuing functionality, which provides the platform for the present invention.

In operation, Network Signalling is monitored 48 for detection of a TAT trigger. Upon detection of a TAT trigger, a query is launched 50 at the SCP. The query is launched in response to the detected TAT trigger and is operative to request the queue status of the Subscriber line. If, in response to the SCP query, it is determined that the queue is active, the call is forwarded 52 to the IP for addition to the queue. In contrast, if it is determined that the queue is empty, the call is delivered 54 to the Subscriber and a NEL is set to determine the status of the Subscriber's line. Of course, if the Subscriber's line is idle, the call will be connected 56 to the Subscriber. Alternatively, if it is determined that the Subscriber's line is busy, the call will be forwarded 58 to the IP to be placed in the appropriate queue.

The Subscriber's line is thereafter monitored for an idle condition. If an idle condition is detected, a call is placed from the IP to the Subscriber. Upon being answered, answer supervision is forwarded to the IP whereupon the Subscriber is connected to the IP and an announcement is played telling the Subscriber the number of calls currently stacked (waiting) in queue. The call is then transferred at the host COS where the Caller and Subscriber are connected.

The above described method steps may be further understood by reference to the detailed flow diagram of FIG. 4. As shown in block 68, the network attempts to deliver a call to the Subscriber. As part of call processing, the network encounters a Termination Attempt Trigger (TAT), as shown in block 70, it is thereafter determined at block 72 if the Subscriber already has other calls in queue. If there are calls already in queue, the network is directed to forward this call to the IP for further processing as shown in block 74. If there are no calls in queue, the network is directed to set the Next Event List, as shown in block 76 and attempt to connect to the Subscriber's line.

If the Subscriber's line is busy, as shown in block 78, the next event list processing directs the network to forward the call to the IP, as shown in block 80. If the Subscriber's line is not busy, the network will connect the call to the Subscriber, as shown in block 82 and set a monitor on the Subscriber's line to report when it is idle, as shown in block 84. When the call is completed and the Subscriber's line becomes idle, as shown in block 86, the network checks to see if there are any calls left in queue, as shown in block 88. If there are no calls in queue for the Subscriber, this process ends. If there are other calls in queue, the IP is directed to deliver the call from the queue to the Subscriber, as shown in block 90. The process then starts from block 82 and repeats the process previously described.

Calls that are forwarded to the IP as shown in blocks 74 and 80 are connected and the Caller is given a choice of treatments as shown in block 92. If the Caller elects to leave a message, as shown in block 94, the IP forwards the call to a messaging system, as shown in block 96. If the Caller elects an alternate destination, as shown in block 98, then the IP forwards the call to that telephone line, as shown in block 100. The Caller then can elect to disconnect or to be placed in queue and hold waiting for the Subscriber's line to become idle, as shown in block 102. Once the Subscriber's line becomes idle, then the process starts from block 86 as previously described.

Thereafter, answer supervision is forwarded to the IP and the Subscriber is connected to the IP and an announcement is played telling the Subscriber the number of calls currently stacked (waiting in queue). The call is then transferred at the host COS where the Caller and Subscriber are connected as indicated in block 14 and 9, respectively.

Various enhancements and modifications of the above-described method are, of course, contemplated. For example, when a Caller attempts to call a Subscriber and all lines are busy, the IP may be programmed to state a listed directory name, if recorded, and/or an announcement indicating that all lines are busy. The Caller may then be placed into queue and allowed to exit by pressing a designated number such as, for example, "1" on their touch tone phone to leave a message, if the Subscriber has a messaging number associated with their service. As part of the invention, the IP will then attempt to complete the call and if successful, the service will end the query and allow the Caller and Subscriber to maintain their voice connection until it is terminated by one of the parties.

In the event that the lines are still busy, the Caller will remain in queue, at the IP. Announcements may, of course, be placed to the Caller, indicating that the lines are still busy. The Caller will then be provided with the option to exit and leave a message, if the Subscriber has a messaging number. Additional calls that are routed to the IP on a busy condition will be placed in order behind existing calls in queue. If a Subscriber has a messaging number and the Caller presses "1", for example, on their touch tone phone, the Caller will be transferred directly to the Subscriber's messaging service. Once the Caller is transferred to the voice messaging system, the call is complete, and the IP will allow the Caller to remain connected until the call is terminated by the Caller or the messaging system or service. The Caller can, of course, hang up on the telephone at any time to disconnect the call.

Other anticipated enhancements include Subscriber controlled queue slot sizing, music on hold, Subscriber recorded announcements, priority queuing, MIS reports which provide the Subscriber an indication of how many calls are on hold and how long they are waiting by hour, as well as an indicator tone or visual indication which will alert the Subscriber that there are calls holding at the IP.

While the best mode for carrying out the invention has been described in detail, those familiar with the art to which this invention relates will recognize various alternative designs and embodiments for practicing the invention as defined by the following claims.

What is claimed is:

1. For use in an Advanced Intelligent Network (AIN) equipped with Terminating Attempt Trigger (TAT) and terminating Next Event List (NEL) functionality and having at least one Central Office Switch (COS) and a Service Control Point (SCP) in electrical communication with a plurality of Subscriber switches via a signaling network, a method of routing a telephone call from a Caller to a Subscriber telephone line, comprising:

providing an Intelligent Peripheral (IP) in electrical communication with the at least one COS and the SCP, the IP equipped with queuing functionality for each of the Subscribers;

monitoring the signaling to detect a TAT trigger;

launching a query at the SCP for receipt by the IP requesting the queue status of the Subscriber line in response to the detected TAT trigger;

forwarding the call to the IP to be added to the queue in response to a determination that the queue is active;

delivering the call to the Subscriber and setting a NEL to determine the status of a Subscriber's line in response to a determination that the queue is empty;

connecting the call to the Subscriber's line in response to a determination that the line is idle;

forwarding the call to the IP to be placed in queue in response to a determination that the Subscriber's line is busy;

monitoring the Subscriber's line to notify the SCP when the line is idle;

placing a call at the IP to the Subscriber in response to a determination that the Subscriber's line is idle;

forwarding answer supervision to the IP in response to the call being answered by the Subscriber; and, transferring and connecting the Subscriber and the Caller at the COS.

2. The method of claim 1, wherein the signalling network is an SS7 signalling network.

3. The method of claim 1, wherein the COS is provided in electrical communication with the IP via Integrated Services Digital Network (ISDN) primary rate facilities.

4. The method of claim 1, wherein the SCP is an integrated services control point.

5. The method of claim 1, wherein the IP is an intelligent services peripheral.

6. The method of claim 1 further comprising releasing the call from queue when the Caller disconnects or requests to be transferred to the Subscriber's answering services.

7. For use in an Advanced Intelligent Network (AIN) equipped with Terminating Attempt Trigger (TAT) and terminating Next Event List (NEL) functionality and having at least one Central Office Switch (COS) and a Service Control Point (SCP) in electrical communication with a plurality of Subscriber switches via a signaling network, a method of routing a telephone call from a Caller to a Subscriber telephone line, comprising:

providing an Intelligent Peripheral (IP) in electrical communication with the COS and the SCP, the IP equipped with queuing functionality for each of the Subscribers;

monitoring the signalling to detect a TAT trigger;

generating a first electrical signal for receipt by the SCP in response to the detected TAT trigger;

generating a second electrical signal at the SCP for receipt by the IP requesting the queue status of the Subscriber line;

generating a third electrical signal at the SCP for receipt by the Subscriber switch instructing the Subscriber switch to forward the call to the IP to be added to the queue in response to a determination that the queue was active;

generating a fourth electrical signal at the SCP for receipt by the Subscriber switch instructing the Subscriber switch to deliver the call to the Subscriber and set a NEL to determine the status of the Subscriber's line in response to a determination that the queue is empty;

connecting the call to the Subscriber's line in response to a determination that the line is idle;

generating a fifth electrical signal at the Subscriber's switch for receipt by the SCP in response to a determination that the Subscriber's line is busy;

generating a sixth electrical signal at the SCP for receipt by the Subscriber's switch instructing the Subscriber's switch to forward the call to the IP to be placed in queue;

generating a seventh electrical signal at the SCP for receipt by the Subscriber's switch instructing the Subscriber's switch to set a monitor on the Subscriber's line and to notify the SCP when the line is idle;

generating an eighth electrical signal at the Subscriber switch for receipt by the SCP in response to a determination that the Subscriber's line is idle;

generating a ninth electrical signal at the SCP for receipt by the IP instructing the IP to call the Subscriber via the COS;

generating a tenth electrical signal at the COS for receipt by the IP to forward answer supervision to the IP in response to the call being answered by the Subscriber; and, generating an eleventh electrical signal at the IP for receipt by the COS to transfer and connect the Subscriber and the Caller at the COS.

8. The method of claim 5, wherein the Caller and Subscriber are connected at the COS using two B channel transfer ISDN capability.

* * * * *